US006583353B2

(12) United States Patent

Murakoshi et al.

(10) Patent No.: US 6,583,353 B2
(45) Date of Patent: Jun. 24, 2003

(54) ELECTRICAL JUNCTION BOX

(75) Inventors: Hiroyuki Murakoshi, Shizuoka-ken (JP); Hiroyuki Sahara, Shizuoka-ken (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 10/013,730

(22) Filed: Dec. 13, 2001

(65) Prior Publication Data

US 2002/0074148 A1 Jun. 20, 2002

(30) Foreign Application Priority Data

Dec. 14, 2000 (JP) ....................................... 2000-380395

(51) Int. Cl.[7] .................................................. H02G 3/08

(52) U.S. Cl. .......................... 174/50; 174/59; 439/76.2; 220/3.2; 220/4.02

(58) Field of Search ........................... 174/50, 59, 52.1, 174/52.4, 60; 439/76.1, 76.2, 688, 724, 65, 66, 69, 364, 271; 220/3.2, 3.3, 3.4, 3.7, 4.02, 4.01

(56) References Cited

U.S. PATENT DOCUMENTS 4,674,819 A * 6/1987 Fujitani et al. ............. 439/404
4,729,740 A * 3/1988 Crowe et al. ................. 174/59
4,781,600 A * 11/1988 Sugiyama et al. ............ 29/830
4,940,419 A 7/1990 Kurita et al.
4,956,748 A * 9/1990 Yamamoto et al. ........... 439/34
5,057,026 A * 10/1991 Sawai et al. .................. 439/43
5,295,842 A * 3/1994 Ozaki et al. .................. 174/59
5,478,244 A 12/1995 Maue et al.
5,587,890 A 12/1996 Happ et al.
5,703,757 A * 12/1997 Hayes et al. ............... 174/52.1
5,735,713 A 4/1998 Sugiura
5,823,797 A 10/1998 Sugiyama
5,877,944 A * 3/1999 Onizuka ..................... 361/644
5,902,138 A * 5/1999 Murakami ................. 439/76.2
5,903,438 A * 5/1999 Deschamps et al. ....... 174/52.1
5,920,034 A * 7/1999 Saka et al. ..................... 174/59
5,995,380 A * 11/1999 Maue et al. ................ 174/254
6,008,982 A * 12/1999 Smith ........................ 174/52.1
6,010,341 A * 1/2000 Matsuoka ................... 439/364
6,046,904 A * 4/2000 Kubat ....................... 174/52.1
6,215,101 B1 * 4/2001 Kondo et al. ............. 174/52.1
6,218,740 B1 * 4/2001 Mildice ..................... 439/76.2
6,290,509 B1 * 9/2001 Hattori et al. ............. 439/76.2
6,297,450 B1 * 10/2001 Yu .............................. 174/48
6,310,293 B1 * 10/2001 Kawakita ................... 174/68.2
6,350,949 B1 * 2/2002 Boyd .......................... 174/50
6,368,118 B1 * 4/2002 Sakamoto et al. ......... 439/76.2
6,368,119 B2 * 4/2002 Murakami ................. 439/76.1

FOREIGN PATENT DOCUMENTS

JP 7-9023 2/1995

* cited by examiner

*Primary Examiner*—Dean A. Reichard
*Assistant Examiner*—Angel R. Estrada
(74) *Attorney, Agent, or Firm*—Finnegan, Henderson, Farabow, Garrett, & Dunner, L.L.P.

(57) ABSTRACT

An electrical junction box (10) is provided with a power supply (17) and a distribution portion (16). At least the power supply (17) is modularized, the power supply (17) and the distribution portion (16) are structurally independent from each other, and the independent power supply (17) and the distribution portion (16) are electrically connected to each other through a connecting portion (27).

8 Claims, 7 Drawing Sheets

ELECTRICAL JUNCTION BOX

BACKGROUND OF THE INVENTION

1. Field of the Invention

The present invention relates to an electrical junction box for distributing current supplied through a power supply to each electric component by a distribution portion.

2. Description of Related Art

Many electric components are provided in an instrument panel, an engine room, a roof and the like of an automobile. Harnesses connected to these electric components are collectively wired in an electrical junction box. As a conventional electrical junction box, there is one disclosed in a Japanese Utility Model Application Laid-open No. H7-9023 proposed by the present applicant. In this electrical junction box, a power supply into which electric power is input from a battery or the like, and a distribution portion for distributing the current output from the power supply to the various electric components are structurally integrally incorporated conventionally. For example, FIG. 1 shows one wiring board 1 incorporated in the electrical junction box. On the wiring board 1, a power supply bus bar (power supply) 2 and a distribution bus bar (distribution portion) 3 are intermingled.

In generally, a power supply of an electrical junction box has relatively high degree circuit construction including fuse and relay. Therefore, it is preferable to assemble the power supply using automation equipment. On the other hand, a distribution portion can be constructed as a general wiring construction and thus, automation equipment is not always necessary. Thus, power supplies are produced in a country or a region where electric supply is stable, and distribution portions are produced manually in a country or a region where labor costs are low, so that the automation equipment can be simplified and the producing costs can be lowered.

However, as described above, since the power supply bus bars 2 and the distribution bus bars 3 are intermingle, the power supply and the distribution portion can not easily be separated. Therefore, the electrical junction boxes must entirely be produced in a country or a region where automation equipment is available, and the producing costs are inevitably increased due to the equipment costs.

Further, when the power supply and the distribution portion are structurally integrally formed, or when only the power supply is changed due to specification changed, e.g., when a power supply constituted by a mechanical relay and a fuse is changed to a power supply using a semiconductor relay, it is necessary to change the entire electrical junction box including the distribution portion on a large scale or to produce the electrical junction box as a totally new electrical junction box. Therefore, costs including the equipment costs are increased, and it is estimated that costs of products are largely increased.

SUMMARY OF THE INVENTION

It is an object of the present invention to provide an electrical junction box in which a power supply and a distribution portion are made structurally independent so that the power supply and the distribution portion can be produced in optimal places and by optimal means, and even when the power supply is changed, this change does not affect the distribution portion so that costs of the products are not increased, and the electrical junction box can meet the specification change of the power supply and future development.

A first aspect of the present invention provides an electrical junction box comprising power supplies, and a distribution portion electrically connected to the power supply, wherein at least the power supply is modularized, the power supply and the distribution portion are structurally made independent from each other, the independent power supply and the distribution portion can be electrically connected to each other through a connecting portion.

In this case, since the power supply and the distribution portion are structurally independent from each other, the power supplies can be produced in a country or a region where automation equipment is completed, and the distribution portion can be produced manually in a country or a region where labor costs are low, and the power supplies and the distribution portion produced in the respective countries or regions are electrically connected to each other through the connecting portion to complete the electrical junction box. Therefore, since the distribution portion is produced manually, the automation equipment may only be provided with equipment necessary only for producing the power supply and as a result, the construction of the automation equipment required for producing the electrical junction box can be minimized. Even when the specification of the power supply is changed, the changed power supply can be electrically connected to the distribution portion without changing the distribution portion.

According to a second aspect of the invention, in the electrical junction box of the first aspect, the power supplies are provided with a plurality of kinds of connecting portions having the same shape, each the power supply can be electrically connected to the distribution portion.

In this case, since the plurality of kinds of connecting portions of the power supplies have the same shape, even when a different kind of power supply is to be electrically connected to the distribution portion, the power supply can be electrically connected without using a junction member, and the number of the entire parts is prevented from being increased.

DESCRIPTION OF THE PREFERRED EMBODIMENTS

An embodiment of the present invention will be explained in detail with reference to the accompanying drawings.

Figure 1:
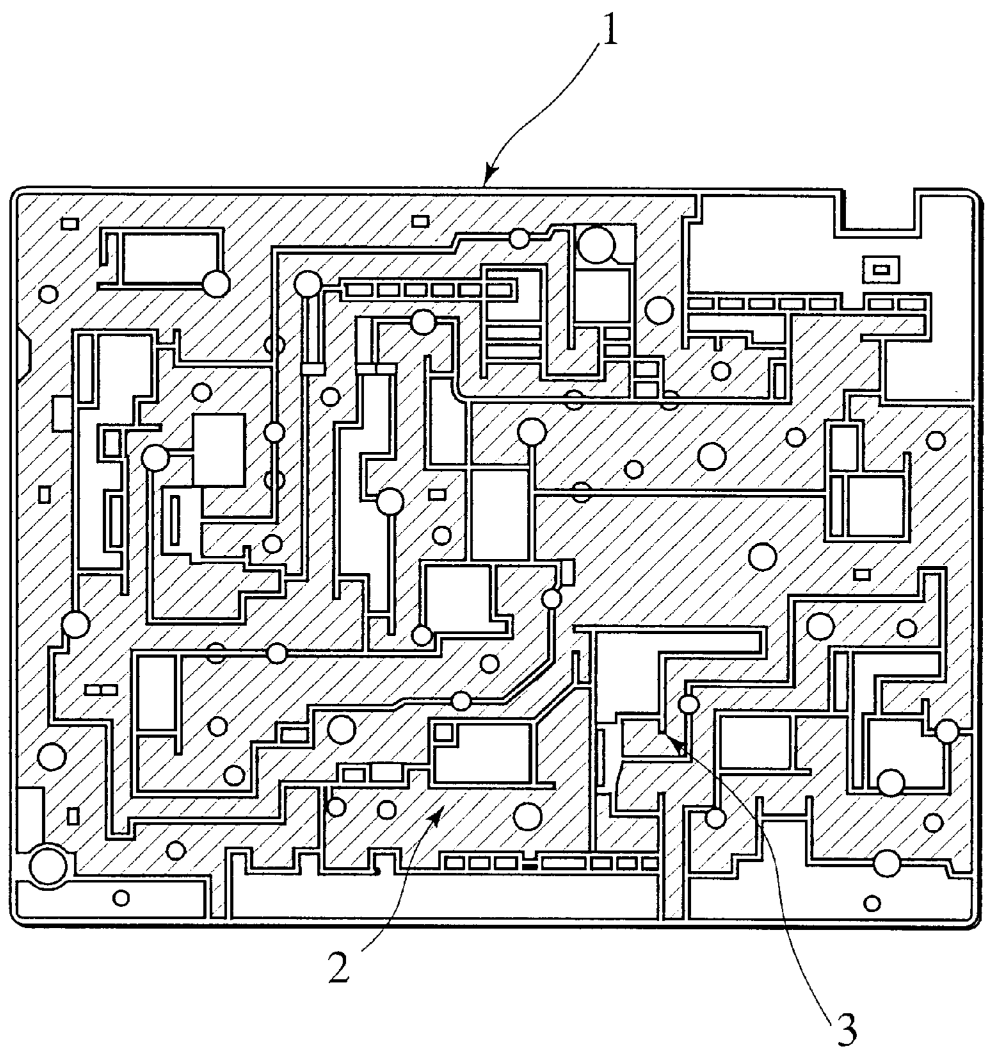
FIG.1 PRIOR ART
FIG. 1 is a plan view showing a conventional bus bar on which power supply and distribution portion are intermingle.
Figure 2:
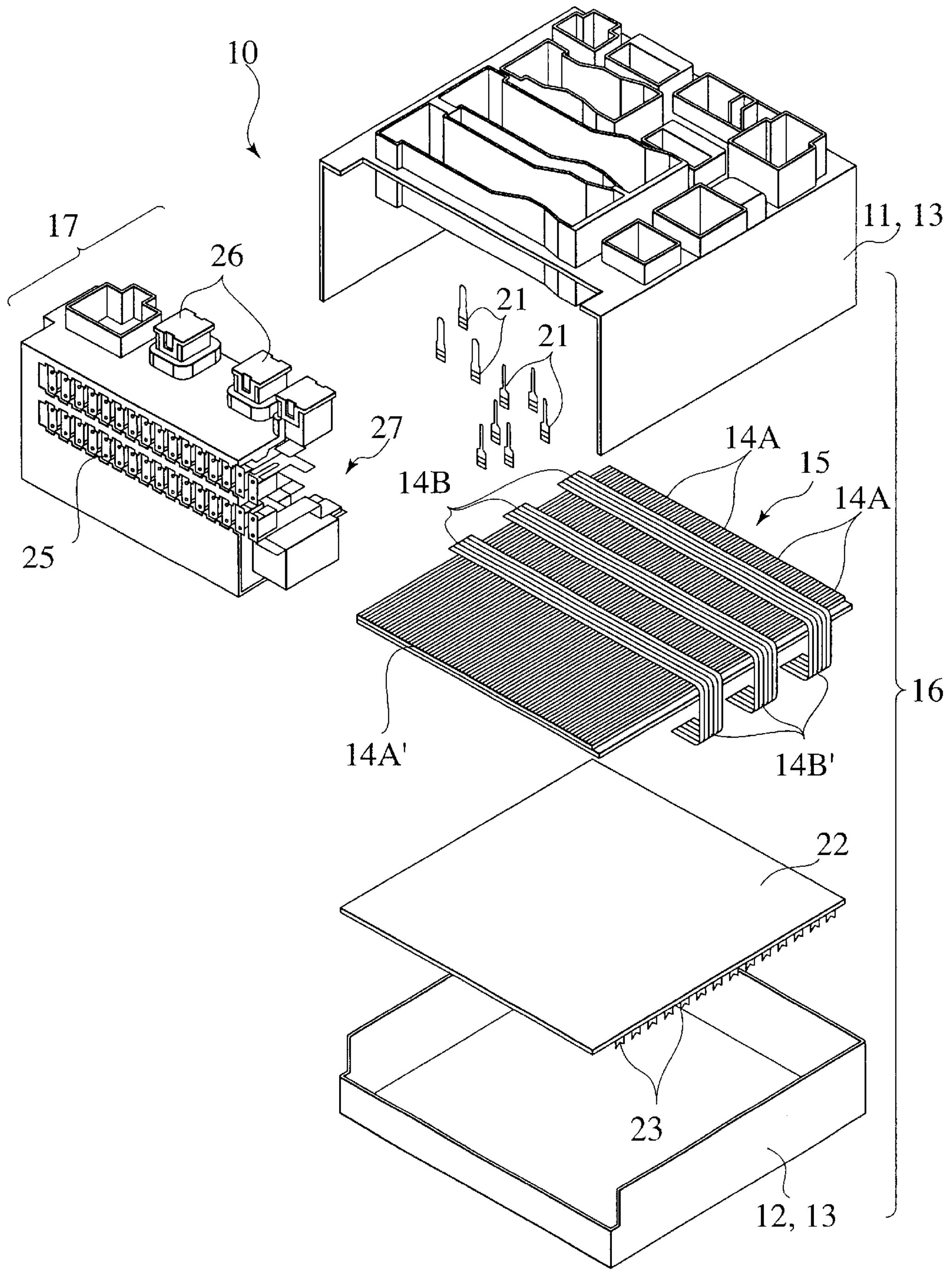
FIG. 2 is an exploded perspective view of an electrical junction box showing an embodiment of the present invention.

As shown in FIG. 2, an electrical junction box 10 of the present embodiment comprises a distribution portion 16 including a case 13 comprising a main cover 11 and an under cover 12, and a circuit 15 using first and second flat wire harnesses 14A and 14B. The circuit 15 is accommodated in the case 13. The electrical junction box 10 also comprises a power supply 17 mounted to one side of the case 13. At least the power supply 17 is modularized, the power supply 17 and the distribution portion 16 are structurally independent form each other, and the independent power supply 17 and the distribution portion 16 can be electrically connected to each other through a connecting portion 27.

Figure 3:
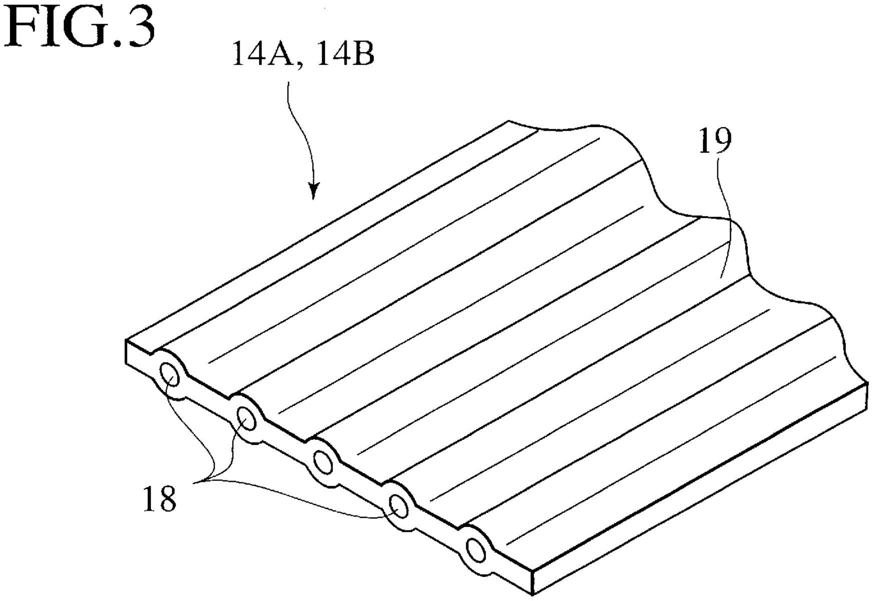
FIG. 3 is an enlarged perspective view of an end of a flat harness provided on the distribution portion showing the one embodiment of the invention.
Figure 4:
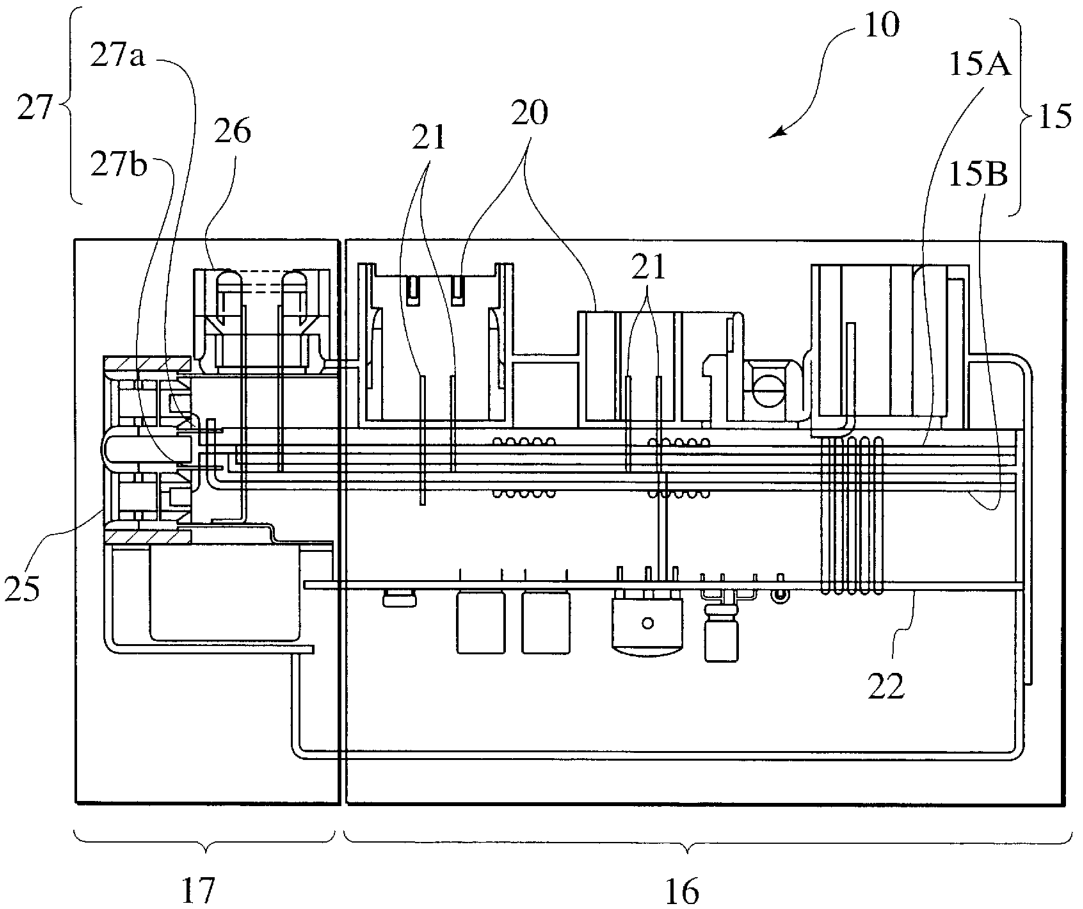
FIG. 4 is a side sectional view of the electrical junction box showing the one embodiment of the invention.

That is, as shown in FIG. 3, each of the first and second flat wire harnesses 14A and 14B comprises electric wires 18, 18 . . . as a plurality of electric conductors arranged in parallel side-by side at predetermined distances from one another, and outside of the series of electric wires 18, 18 . . . are covered with a insulating resin covering body 19. The circuit 15 is conveniently shown as one layer in FIG. 2, but in an actual case, the circuit 15 is of two layer construction comprising a first layer circuit 15A and a second layer circuit 15B as shown in FIG. 4. The first layer circuit 15A is shown in FIG. 5 and the second layer circuit 15B is shown in FIG. 6.

Figure 5:
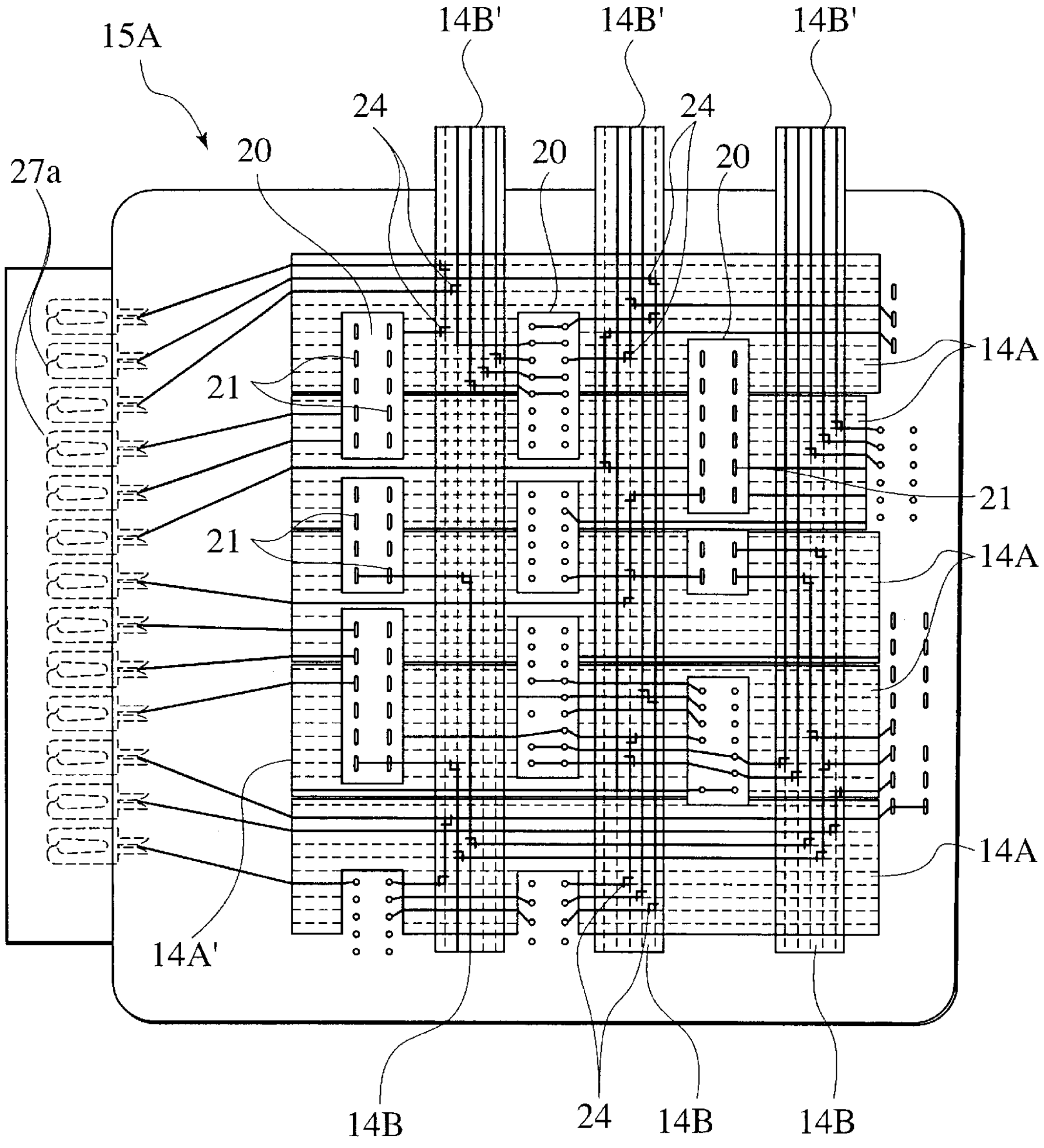
FIG. 5 is a plan view of a first layer circuit provided on the distribution portion showing the one embodiment of the invention.

As shown in FIG. 5, the first layer circuit 15A comprises a plurality of first flat wire harnesses 14A arranged in the lateral direction in the drawing, and a plurality of second flat wire harnesses 14B arranged in the vertical direction in the drawing. These first and second flat wire harnesses are intersecting with each other substantially at right angles and superposed on each other. As shown in FIG. 6, the second layer circuit 15B comprises first and second flat wire harnesses 14A and 14B intersecting with each other substantially at right angles and superposed on each other like the first layer circuit 15A.

Figure 6:
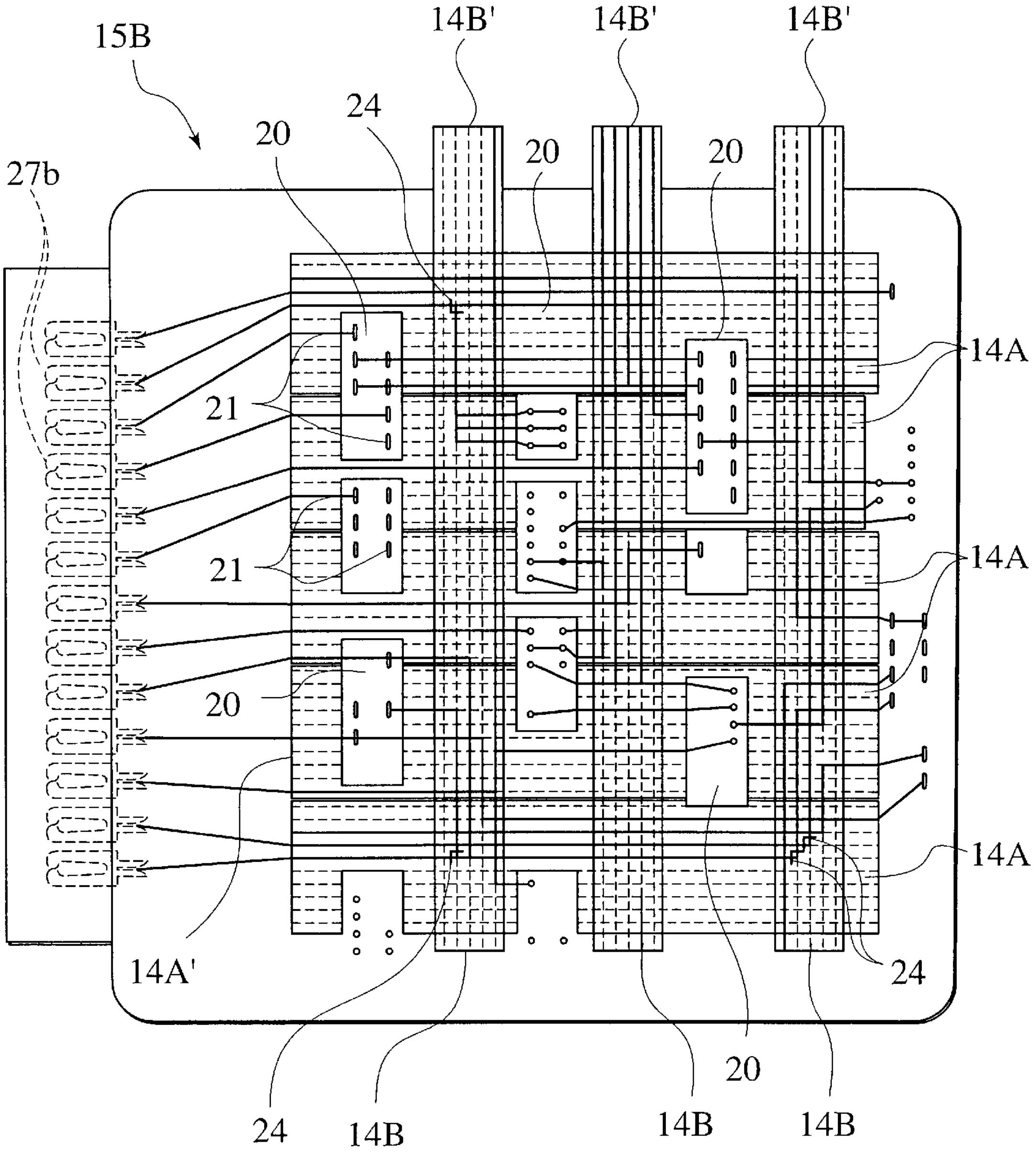
FIG. 6 is a plan view of a second layer circuit provided on the distribution portion showing the one embodiment of the invention.

As shown in FIGS. 5 and 6, a plurality of connectors 20, 20 . . . are provided on each of the first and second layer circuits 15A and 15B. The connector 20 is in conduction with an arbitrary electric wire 18 of the first flat harness 14A. Pressure welded terminals 21 connected to the electric wire 18 by pressure welding are used for the conduction between the connectors 20, 20, . . . and the electric wire 18 as shown in FIG. 4. As shown in FIG. 2, one end 14B' of each of the second flat harness 14B of each of the first and second layer circuits 15A and 15B is bent twice substantially at right angles, and a tip end of the bent one end is electrically connected to each the pressure welded terminal 23.

Figure 7A:
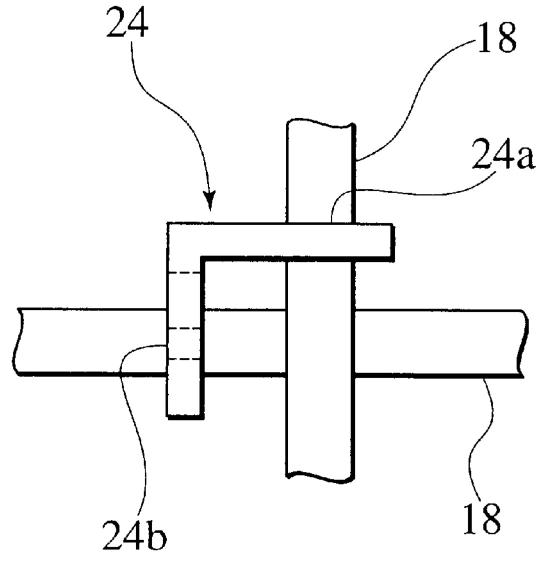
FIG. 7 is an explanatory view of an L-shaped pressure welded terminal provided on the first and second layer circuits.
Figure 7B:
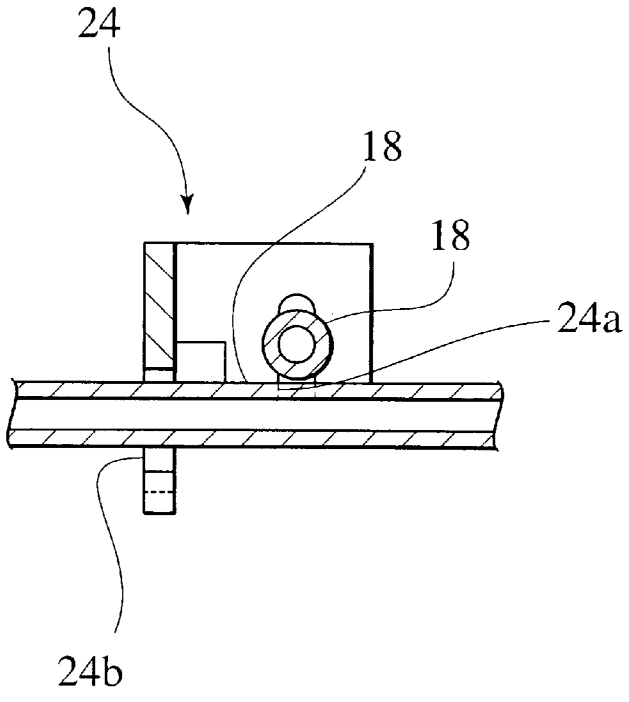

Arbitrary electric wires 18 are connected to each other through an L-shaped pressure welded terminal 24 as shown in FIGS. 7A and 7B. As shown in FIG. 7A, this L-shaped pressure welded terminal 24 has L-shape as viewed from above. As shown in FIG. 7B, opposite ends of the pressure welded terminal 24 are formed with pressure welded blades 24*a* and 24*b* such that the pressure welded blades 24*a* and 24*b* are pressure welded on the electric wires 18 and 18 with which the first and second flat wire harnesses 14A and 14B intersect.

Therefore, the distribution portion 16 of the electrical junction box 10 is constructed such that the connectors 20, 20 . . . are connected to the first flat wire harnesses 14A of the first and second layer circuits 15A and 15B, and the electron board 22 is connected to the second flat harness 14B, and the electric wires 18, 18 of the first and second flat wire harnesses 14A and 14B are connected at appropriate locations by the L-shaped pressure welded terminals 24.

On the other hand, as shown in FIG. 4, the power supply 17 is constituted as a relay module having a low-profile fuse 25 and a low-profile large current fuse 26. This power supply 17 is constituted by first and second pressure welded terminals 27*a* and 27*b* respectively corresponding to the first and second flat wire harnesses 14A and 14B as the connecting portion 27. The first flat harness 14A of the first layer circuit 15A is connected to the first pressure welded terminal 27*a*, and the first flat harness 14A of the second layer circuit 15B is connected to the second pressure welded terminal 27*b*. In this case, arbitrary electric wire 18 of the one end 14A' of each the first flat harness 14A is pressure welded and connected to each of the first and second pressure welded terminals 27*a* and 27*b*. With this connection, the power supply 17 and the distribution portion 16 are electrically connected to each other. Of course, when the electrical connection is established, the power supply 17 is mechanically and integrally coupled to the case 13 of the distribution portion 16 through engaging means (not shown).

With the above construction, the operation of the electrical junction box 10 of the present embodiment will be explained. That is, in the present embodiment as shown in FIG. 4, current supplied from the power supply 17 to the distribution portion 16 is distributed to various electric components connected to the connectors 20, 20 . . . of the distribution portions 16, e.g., to various meters and various switches.

In the present embodiment, the power supply 17 and the distribution portion 16 are independent from each other. Therefore, in the electrical junction box 10, after the power supply 17 and the distribution portion 16 were separately produced, they can be electrically connected to each other through the pressure welded terminals 27*a* and 27*b*. Thus, in the electrical junction box 10 of this embodiment, it is unnecessary to produce the power supply 17 and the distribution portion 16 at the same time at the same place, and they can be produced in different countries or regions.

Therefore, since the power supply 17 constituted as the relay module requires connecting technique such as welding, the power supply 17 can be produced using automation equipment in a country or a region where electric supply is stable, e.g., in an advanced country. On the other hand, the distribution portion 16 occupied with cloth portions can sufficiently be produced manually without using the automation equipment. Thus, the distribution portion 16 can be produced in a country or a region where labor costs are low, e.g., in a developing country near a customer country, or when the customer country is the developing country, the distribution portion 16 can be produced manually in that country. The power supply 17 produced in the advanced country can be sent to the country where the distribution portion 16 is produced, and they can be finally assembled manually, i.e., the first flat wire harnesses 14A of the first and second layer circuits 15A and 15B of the distribution portion 16 can be connected to the first and second pressure welded terminals 27*a* and 27*b* of the power supply 17 to complete the electrical junction box 10.

As described above, in the electrical junction box 10 of this embodiment, since the distribution portion 16 is produced manually, the automation equipment may only be provided with equipment necessary only for producing the power supply 17 and as a result, the construction of the automation equipment required for producing the electrical junction box 10 can be minimized, and the producing costs can be reduced. Of course, both the power supply 17 and the distribution portion 16 can be produced in the advanced country using the automation equipment, or can be produced in the developing country manually, and this judgement may be made in view of the costs or other circumstances. Therefore, according to the electrical junction box 10 of the present embodiment, the electrical junction box 10 can be obtained in the optimal manner best in the world, and the costs can be reduced.

In the present embodiment, since the power supply 17 and the distribution portion 16 are independent from each other, even when the specification of the power supply 17 is changed, it is unnecessary to change the distribution portion 16, and the specification can be changed without largely increasing the costs.

Figure 8:
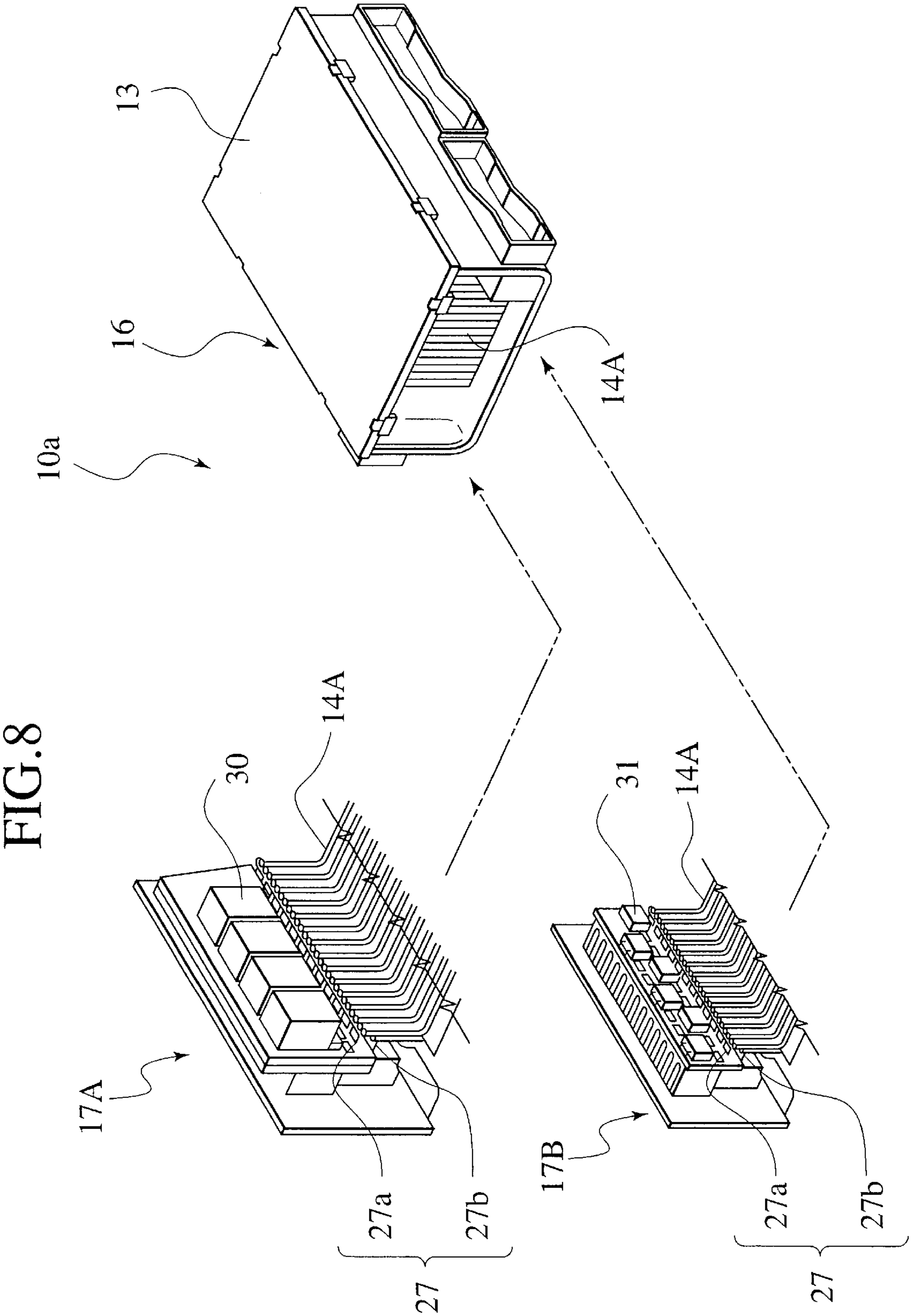
FIG. 8 is a perspective view of a state in which the power supply and the distribution portion of the electrical junction box are separated in another embodiment of the invention.

FIG. 8 shows another embodiment. The same constituent elements as those of the above embodiment are designated with the same reference numbers, and redundant explanation is omitted. FIG. 8 is a perspective view showing a state in which the power supply and the distribution portion of the electrical junction box are separated from each other. This embodiment is different from the previous embodiment in that the connecting portions 27 with respect to the distribution portion 16 have the same shape, and a plurality kinds of power supplies 17 are provided.

That is, in the electrical junction box **10*a* of this embodiment, a first power supply 17A constituted as a relay module, and a second power supply 17B constituted as a power source module provided with a semiconductor relay (IPS) 31 functioning as a fuse and a relay are prepared, and the first power supply 17A and the second power supply 17B can selectively be connected to the distribution portion 16. In this case, as in the previous embodiment, in the first and second power supplies 17A and 17B, the first flat wire harnesses 14A of the distribution portions 16 are electrically connected to the pressure welded terminals 27*a* and 27*b* by pressure welding, but the number of each of the pressure welded terminals 27*a* and 27*b* of the first and second power supplies 17A and 17B is set to equal to each other so that the shape of each of the connecting portions 27** can be set equal to each other.

Therefore, in this embodiment, the first power supply 17A provided with the inexpensive mechanical relay 30 and the second power supply 17B provided with the expensive semiconductor relay 31 can selectively be assembled directly without using a junction member. Therefore, the function of the electrical junction box **10*a* can be enlarged by freely selecting the first and second power supplies 17A and 17B, the number of constituent parts of the electrical junction box 10*a*** is prevented from being increased, and the product cost is prevented from being increased.

In each of the embodiments, the inside of the distribution portion 16 is constituted using the first and second flat wire harnesses 14A and 14B, but the invention is not limited to this, and it is of course possible to apply the invention to a conventional structure using the wiring board or printed board, and the power supply and the distribution portion can be made independent from each other. As the power supply 17, it is possible to select (a) a combination of the fuse and mechanical relay, (b) a combination of the fuse and the semiconductor relay (IPS) and (c) only the semiconductor relay. In the embodiment shown in FIG. 8, another power supply may be further added in (b), and the number of kinds of power supplies can be increased.

What is claimed is:

1. An electrical junction box comprising:

a modularized power supply;

a distribution portion electrically connectable to the power supply, the distribution portion having a plurality of layers of circuit, a first layer of circuit including a plurality of first flat wire harnesses oriented in a lateral direction, a next layer of circuit including a plurality of second flat wire harnesses oriented in a longitudinal direction; and a connecting portion having a plurality of pressure welded terminals for removably connecting the power supply and the distribution portion, each pressure welded terminal connectable to a corresponding plurality of flat wire harnesses on a corresponding layer of circuit.

2. An electrical junction box according to claim 1, wherein the plurality of first flat wire harnesses are arranged in parallel to one other at predetermined distances from one another and the plurality of second flat wire harnesses are arranged in parallel to one other at predetermined distances from one another, and further comprising electric conductors covering the plurality of first and second flat wire harnesses with an insulating resin.

3. An electrical junction box according to claim 2 wherein an arbitrary electric conductor of the first flat wire harnesses and an arbitrary electric conductor of the second flat wire harnesses are electrically connected to each other through at least one of the plurality of pressure welded terminal.

4. A power supply portion connectable to a distribution portion of an electrical junction box, the distribution portion having a plurality of layers of circuit, a first layer of circuit including a plurality of first flat wire harnesses oriented in a lateral direction, a next layer of circuit including a plurality of second flat wire harnesses oriented in a longitudinal direction, the power supply portion comprising:

a connecting portion having a plurality of pressure welded terminals for removably connecting the power supply portion and the distribution portion, each pressure welded terminal connectable to a corresponding plurality of flat wire harnesses on a corresponding layer of circuit.

5. A power supply portion of claim 4, further comprising:

a relay module having a low profile fuse and a low profile large current fuse.

6. A distribution portion connectable to a power supply portion of an electrical junction box, the power supply portion having a connection portion with a plurality of pressure welded terminals, the distribution portion comprising:

a plurality of layers of circuit, a first layer of circuit including a plurality of first flat wire harnesses oriented in a lateral direction, a next layer of circuit including a plurality of second flat wire harnesses oriented in a longitudinal direction, wherein a corresponding plurality of flat wire harnesses on a corresponding layer of circuit is connectable to a corresponding pressure welded terminal of the power supply portion.

7. A distribution portion of claim 6, wherein the plurality of first flat wire harnesses are arranged in parallel to one other at predetermined distances from one another and the plurality of second flat wire harnesses are arranged in parallel to one other at predetermined distances from one another, and further comprising electric conductors covering the plurality of first and second flat wire harnesses with an insulating resin.

8. A distribution portion of claim 7, wherein an arbitrary electric conductor of the first flat wire harnesses and an arbitrary electric conductor of the second flat wire harnesses are electrically connected to each other through at least one of the plurality of pressure welded terminal.

* * * * *

UNITED STATES PATENT AND TRADEMARK OFFICE

CERTIFICATE OF CORRECTION

PATENT NO. : 6,583,353 B2
DATED : June 24, 2003

INVENTOR(S) : Hiroyuki Murakoshi and Hiroyuki Sahara

It is certified that error appears in the above-identified patent and that said Letters Patent is hereby corrected as shown below:

<u>Column 11,</u>
Lines 18, 20, 62 and 64, "other" should read -- another --.
Line 24, "claim 2" should read -- claim 2, --.
Line 28, "terminal" should read -- terminals --.

<u>Column 12,</u>
Line 6, "terminal" should read -- termimals --.

Signed and Sealed this

Twenty-third Day of September, 2003

JAMES E. ROGAN
*Director of the United States Patent and Trademark Office*